United States Patent
Sjölund

(10) Patent No.: US 6,550,425 B1
(45) Date of Patent: Apr. 22, 2003

(54) GATE FOR CATTLE HANDLING SYSTEMS

(75) Inventor: Martin Sjölund, Stockholm (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/048,587

(22) PCT Filed: Aug. 2, 2000

(86) PCT No.: PCT/SE00/01535

§ 371 (c)(1),
(2), (4) Date: Feb. 1, 2002

(87) PCT Pub. No.: WO01/08468

PCT Pub. Date: Feb. 8, 2001

(30) Foreign Application Priority Data

Aug. 2, 1999 (SE) ................................ 9902828

(51) Int. Cl.⁷ ................................................ A01K 1/00
(52) U.S. Cl. ..................................................... 119/524
(58) Field of Search .................. 119/524, 516, 119/481, 518, 738, 14.03, 14.14, 427, 510

(56) References Cited

U.S. PATENT DOCUMENTS 3,785,346 A * 1/1974 Dower ........................ 119/524
4,445,460 A * 5/1984 Stencil ........................ 119/510
4,470,373 A * 9/1984 Kesler ......................... 119/427
4,584,268 A * 4/1986 Ceriani et al. ................ 422/61
6,082,306 A * 7/2000 Hatfield ....................... 119/524

FOREIGN PATENT DOCUMENTS

| EP | 0 853 875 A2 | 7/1996 |
| EP | 0 736 654 A1 | 10/1996 |
| FR | 2 577 608 A1 | 8/1986 |
| WO | 96/19916 A1 | 7/1996 |
| WO | 99/63808 A1 | 12/1999 |
| WO | 99/18221 A1 | 4/2000 |

* cited by examiner

Primary Examiner—Charles T. Jordan
Assistant Examiner—Judith A. Nelson
(74) Attorney, Agent, or Firm—Birch, Stewart, Kolasch & Birch, LLP

(57) ABSTRACT

A gate for use in cattle handling systems, where animals pass between different areas separated by fences and passage from one area to another takes place through the gate. The gate is spring biased to occupy a closed position, in which it is lockable by at least one catch member being releasable in response to the approach of an animal identified as allowable for passage. The catch member is arranged to provide free passage at all times through the gate in one opening direction and to be actuatable for releasing the gate for opening in the opposite opening direction.

15 Claims, 2 Drawing Sheets

GATE FOR CATTLE HANDLING SYSTEMS

This application is the national phase under 35 U.S.C. §371 of PCT International Application No. PCT/SE00/01535 which has an International filing date of Aug. 2, 2000, which designated the United States of America and was published in English.

BACKGROUND OF THE INVENTION

1. Field of the Invention

The present invention concerns a gate for use in cattle handling systems, where animals pass between different areas.

2. Description of Background Art

A typical such use is in an automatic milking system, where there are, e.g., a feed area, a milking area and a rest area, separated by fences or the like, and passage from one area to another takes place through a gate. Another use could be between enclosed pastures.

Several kinds of such gates are known, e.g., gates of a simple one-directonal kind, always allowing passage in one direction, while always prohibiting passage in the opposite direction (EP 0 853 875 A2, drawing, item 13), power operated gates opening only after accepted identification of an animal (EP 0 853 875 A2, drawing, item 15), and two-way gates (EP 0 853 875 A2, drawing, item 10).

FR-A-2 577 608 discloses a gate preventing animals not carrying a magnet from passage through the gate in both opening directions thereof, while always allowing passage of animals carrying a magnet in both opening directions. This kind of gate does not meet the typical requirement for passage of an animal through a normally closed gate between, e.g., a rest area and a feed area, viz., that the animal may pass only if it has just been milked, whereas it may always pass from the feed area to the rest area.

SUMMARY AND OBJECTS OF THE INVENTION

Based on the general teachings of FR-A-2 577 608, it is the aim of the present invention to provide a new gate which is suitable for use in installations of the kind referred and which fulfills the requirement just mentioned.

BRIEF DESCRIPTION OF THE DRAWINGS

Two embodiments of the present invention will be described hereinafter in connection with an automatic milking system, reference being made to the accompanying drawings, wherein.

DETAILED DESCRIPTION OF THE PREFERRED EMBODIMENTS

Figure 1:
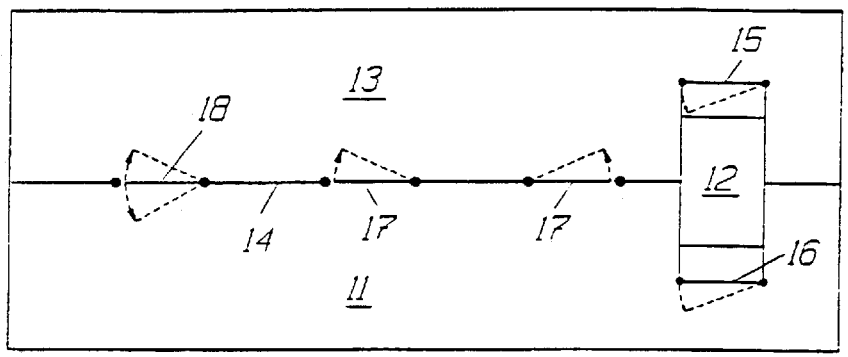
FIG. 1 schematic plan view of typical premises for milk cattle.

FIG. 1 shows a cow-house 10 including a feed area 11, a milking area 12 and a rest area 13. A fence 14 separates the rest area from the feed area. The milking area 12, here shown to have the shape of a milking box, is located in the fence and has an entrance gate 15 and an exit gate 16. Thus, one way to pass from the rest area to the feed area is through the milking box. Two one-way gates 17 and one two-way gate 18 according to the present invention are shown in the fence 14 to further connect the feed area 11 and the rest area 13.

Figure 2:
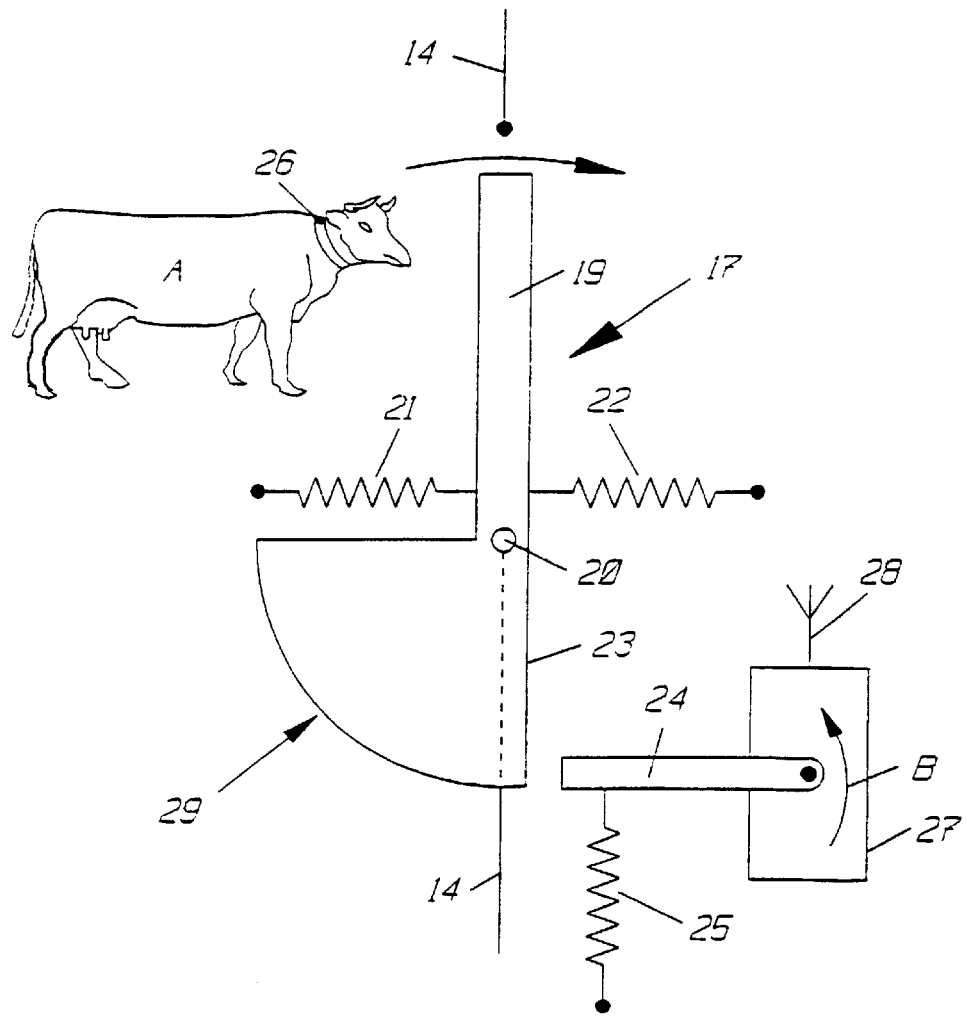
FIG. 2 is a schematic plan view of a first embodiment of a gate.

A one-way gate 17 is shown separately in FIG. 2. It includes a leaf 19 pivotable about a vertical pivot 20. Urged by springs 21, 22 it normally occupies the closed position shown. An extension 23 of the leaf serves as a bolting means for the gate. A pivotable catch member 24 is urged by a spring 25 to normally occupy the position shown, where it prevents opening of the gate in a counterclockwise direction, i.e. to the left in FIG. 2. However, an animal A is free to pass in the opposite direction, i.e., to the right in FIG. 2. After such passage, the gate will not swing back to the left due to the catch member being positioned as shown. Means are provided to allow opening of the gate also to the left upon approach of an animal identified to fulfil predetermined conditions for passage from the rest area to the feed area, typically having been recently milked. As is known in the art, such means include an identification means 26, typically a transponder, carried by the animal, and a transmitting/receiving unit 27 having an antenna 28. Preferably, the antenna is of a kind referred to as a vertical rod reader and has a limited range of typically 30 cm. In FIG. 2 the antenna is shown to be placed on the unit 27, but it as evident that other locations are possible as well. For instance, the antenna can be located on the gate itself. In that case, it is preferred to use a horizontal antenna. It is also possible to place the antenna on the side of the gate from which passage is not always allowed. Upon approach of an animal identified to fulfil the requirements of passage, the unit 27 triggers a suitable power means, such as an electromagnet, to rotate the catch 24 in the counterclockwise direction as indicated by an arrow B, thereby allowing pivoting of the gate in the counterclockwise opening direction.

As soon as the animal is beyond the reach of the antenna, or, a pre-set time has elapsed, the power means releases the catch 24 and the spring 25 returns it to its normal locking position.

It is preferred to shape the extension 23 of the gate with a sector-like portion having an arcuately curved edge 29. Thereby the catch 24 will slide along the edge 29 in case the catch 24 is released while the gate is not quite opened.

Figure 3:
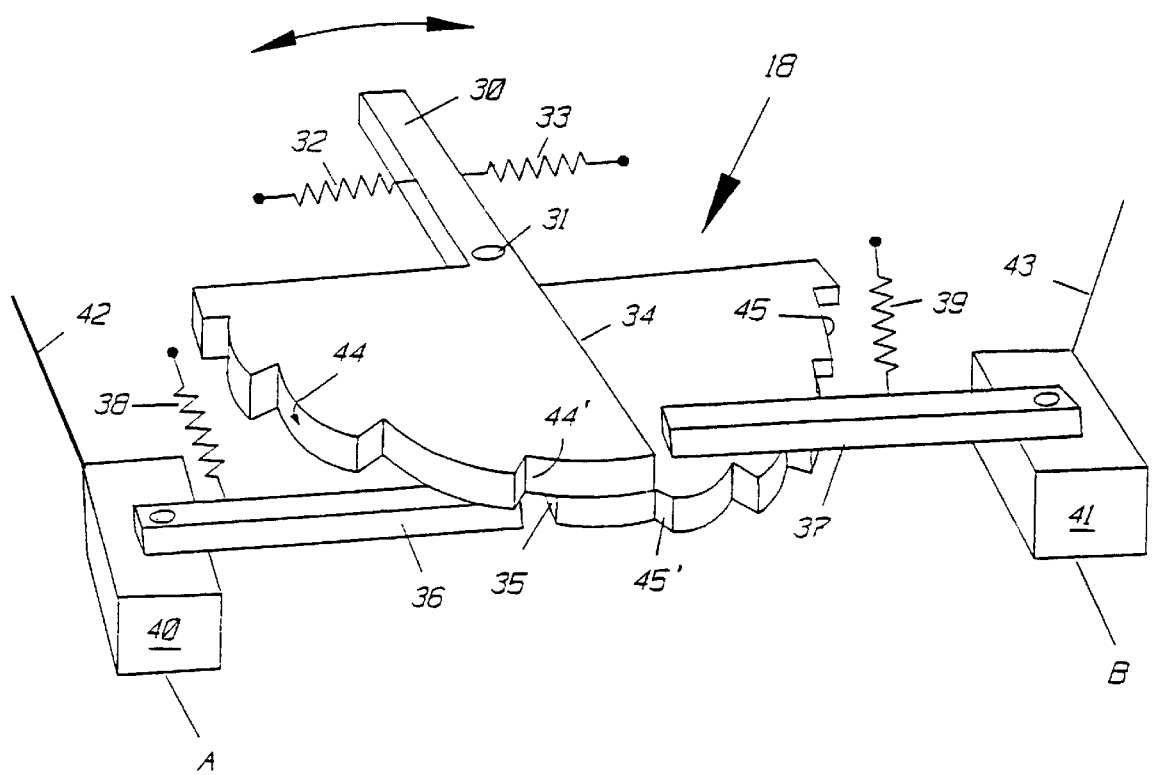
FIG. 3 is a schematic perspective view of a second embodiment of the gate.

FIG. 3 shows an embodiment of a two-way gate 18 according to the present invention shown to be locked in both directions. This embodiment includes a gate leaf 30 pivotable about a vertical pivot 31. Urged by springs 32, 33 it normally occupies the closed position shown. Two extensions 34, 35 located in separate planes serve as bolting means for the gate. Respective pivotable catch members 36, 37 urged by respective springs 38, 39 to normally occupy the positions shown prevent opening of the gate in both directions. The catch members 36, 37 are controlled by respective transmitting/receiving units 40, 41 having antennas 42, 43, respectively. Approach from either direction of an animal identified as allowed for passage will cause the respective catch member to rotate so as to enable opening of the gate in the respective direction. Evidently, it is possible to have different criteria for opening in the two directions. Thus, in order to comply with the aim of the present invention, one of the catches could be caused to be constantly kept rotated to enable opening of the gate in one direction, for instance by transmitting a radio signal from another source than that carried by the cattle.

Although the extensions 34, 35 may be shaped with arcuate edges as in FIG. 2, they are shown in FIG. 3 to have edges 44, 45 provided with at least one and preferably a plurality of ratchet teeth 44', 45', thereby stopping rotation of the gate in positions defined by an individual tooth 44', 45' as soon as a respective catch member 36, 37 is no longer triggered. In such case a catch member will be urged by its spring towards an edge 44, 45, and will engage a tooth 44', 45', thereby stopping further opening of the gate. This will also prevent a following animal to fully enter the gate, since it will immediately lock at the first and each following ratchet tooth 44', 45'.

It is evident that a single, toothed, sector-like extension can be used also with the gate shown in FIG. 2.

What is claimed is:

1. A gate for use in cattle handling systems, where animals pass between different areas separated by fences and passage from one area to another takes place through said gate, which is spring biased to occupy a closed position, in which it is lockable by at least one catch member being releasable in response to approach of an animal identified as allowable for passage, wherein that the catch member is arranged to provide free passage at all times through the gate in one opening direction and to be actuatable for releasing the gate for opening in the opposite opening direction.

2. The gate according to claim 1, wherein the gate is pivotable about a pivot and has an extension beyond the pivot engagable by the catch member to prevent opening of the gate.

3. The gate according to claim 2, wherein the extension has an arcuate edge against which the catch member may slide when opening the gate in said one direction.

4. The gate according to claim 3, wherein the extension has an arcuate edge provided with at least one ratchet tooth engagable by said catch member.

5. The gate according to claim 1, wherein two individually releasable catch members are arranged.

6. The gate according to claim 5, wherein the two catch members are actuatable for release by different criteria.

7. The gate according to claim 1, wherein an antenna is located on the side of approach of the animal.

8. The gate according to claim 2, wherein two individually releasable catch members are arranged.

9. The gate according to claim 3, wherein two individually releasable catch members are arranged.

10. The gate according to claim 4, wherein two individually releasable catch members are arranged.

11. The gate according to claim 2, wherein an antenna is located on the side of approach of the animal.

12. The gate according to claim 3, wherein an antenna is located on the side of approach of the animal.

13. The gate according to claim 4, wherein an antenna is located on the side of approach of the animal.

14. The gate according to claim 5, wherein an antenna is located on the side of approach of the animal.

15. The gate according to claim 6, wherein an antenna is located on the side of approach of the animal.

* * * * *